United States Patent
Piao et al.

(10) Patent No.: US 12,495,966 B2
(45) Date of Patent: Dec. 16, 2025

(54) MULTIMODAL HETEROGENEOUS DATA FUSION RELAY APPARATUS FOR HOME DETECTION OF CARDIOVASCULAR DISEASE

(71) Applicant: Peking Union Medical College, Beijing (CN)

(72) Inventors: Meihua Piao, Beijing (CN); Hongzhen Cui, Beijing (CN); Haoming Ma, Beijing (CN); Aoqi Wang, Beijing (CN)

(73) Assignee: Peking Union Medical College, Beijing (CN)

( * ) Notice: Subject to any disclaimer, the term of this patent is extended or adjusted under 35 U.S.C. 154(b) by 0 days.

(21) Appl. No.: 18/781,368

(22) Filed: Jul. 23, 2024

(65) Prior Publication Data

US 2025/0352060 A1 Nov. 20, 2025

(30) Foreign Application Priority Data

May 14, 2024 (CN) .......................... 202410592980.2

(51) Int. Cl.
*A61B 5/00* (2006.01)

(52) U.S. Cl.
CPC .......... *A61B 5/0002* (2013.01); *A61B 5/0059* (2013.01)

(58) Field of Classification Search
CPC .. A61B 5/0002; A61B 5/0205; A61B 5/02055
USPC ................................................ 600/300, 301
See application file for complete search history.

(56) References Cited

U.S. PATENT DOCUMENTS

| 11,182,417 | B1* | 11/2021 | Mishra | G06F 16/43 |
| 2009/0023422 | A1* | 1/2009 | MacInnis | H04L 63/0861 455/411 |
| 2015/0035959 | A1* | 2/2015 | Amble | A61B 5/0077 348/74 |
| 2017/0347895 | A1* | 12/2017 | Wei | A61B 5/7203 |
| 2018/0332009 | A1* | 11/2018 | Lange | H04L 63/0428 |
| 2019/0053754 | A1* | 2/2019 | Gowda | A61B 5/7264 |
| 2020/0383581 | A1* | 12/2020 | Su | A61B 7/003 |
| 2022/0287565 | A1* | 9/2022 | Yeung | G16H 40/63 |

* cited by examiner

*Primary Examiner* — John R Downey
(74) *Attorney, Agent, or Firm* — Fresh IP PLC; Michael Anderson; Aubrey Y. Chen

(57) ABSTRACT

Provided is a multimodal heterogeneous data fusion relay apparatus for home detection of cardiovascular disease, which relates to the field of home detection. The apparatus includes a data obtaining module, a data fusion module, and a relay transmission module. The data obtaining module is configured to obtain patient's body indicator data, patient's living environment data, and patient's home treatment data; the data fusion module is configured to: separately perform periodical update, integration classification, and data compression on the patient's body indicator data, the patient's living environment data, and the patient's home treatment data, and then perform concatenation reassembly to obtain a data packet of home detection of cardiovascular disease; and the relay transmission module is configured to send the data packet of home detection of cardiovascular disease to a remote terminal. The apparatus can obtain more comprehensive patient's home detection information in time.

5 Claims, 2 Drawing Sheets

MULTIMODAL HETEROGENEOUS DATA FUSION RELAY APPARATUS FOR HOME DETECTION OF CARDIOVASCULAR DISEASE

CROSS REFERENCE TO RELATED APPLICATION

This patent application claims the benefit and priority of Chinese Patent Application No. 2024105929802, filed with the China National Intellectual Property Administration on May 14, 2024, the disclosure of which is incorporated by reference herein in its entirety as part of the present application.

TECHNICAL FIELD

The present disclosure relates to the field of home detection, and in particular, to a multimodal heterogeneous data fusion relay apparatus for home detection of cardiovascular disease.

BACKGROUND

At present, some patients with a cardiovascular disease can recuperate at home. In order to cope with sudden or unexpected conditions, information about the patients at home needs to be detected. For example, the patient's heart rate and blood pressure are detected by using a band. However, currently, detection of related data of the patients at home is discrete and one-sided, and consequently changes of patients' physical conditions cannot be obtained in time.

SUMMARY

The present disclosure provides a multimodal heterogeneous data fusion relay apparatus for home detection of cardiovascular disease, so that more comprehensive patient's home detection information can be obtained in time.

To achieve the above objective, the present disclosure provides the following technical solutions.

A multimodal heterogeneous data fusion relay apparatus for home detection of cardiovascular disease includes a data obtaining module, a data fusion module, and a relay transmission module.

The data obtaining module is connected to an external device and the data obtaining module is configured to obtain patient's body indicator data, patient's living environment data, and patient's home treatment data.

The data fusion module is connected to the data obtaining module and the data fusion module is configured to: separately perform periodical update, integration classification, and data compression on the patient's body indicator data, the patient's living environment data, and the patient's home treatment data, and then perform concatenation reassembly to obtain a data packet of home detection of cardiovascular disease.

The relay transmission module is connected to the data fusion module and the relay transmission module is configured to send the data packet of home detection of cardiovascular disease to a remote terminal.

Optionally, the patient's body indicator data includes a heart rate, blood pressure, oxygen saturation, a body temperature, a urine volume, fluid intake, a body weight, and human trace elements.

The patient's living environment data includes a concentration of carbon dioxide, an ambient temperature, humidity, light intensity, and air quality data in the patient's environment.

The patient's home treatment data includes a physical activity level, medication data, rest data, diet data, maximum sitting duration, sleep quality data, and patient's self-perception information.

Optionally, data types of the patient's body indicator data, the patient's living environment data, and the patient's home treatment data include a text, a digit, an audio, an image, and a video.

Optionally, the data fusion module includes a periodical update unit, an integration classification unit, a compression coding unit, and a concatenation reassembly unit.

The periodical update unit is configured to: periodically obtain a data set from the data obtaining module, and assign a status value to any data in the data set; and when a status value of any data at a current moment is inconsistent with a status value at a previous data receiving moment, update a data set at the previous data receiving moment according to data corresponding to the status value at the current moment, and transmit an updated data set at the previous data receiving moment to the integration classification unit, where the data set includes the patient's body indicator data, the patient's living environment data, and the patient's home treatment data.

Optionally, the integration classification unit is configured to: determine whether any to-be-processed data in the data set transmitted by the periodical update unit is text data to obtain a first result; when the first result is no, determine whether the any to-be-processed data is digital data to obtain a second result; when the second result is no, determine whether the any to-be-processed data is image data to obtain a third result; when the third result is no, determine whether the any to-be-processed data is audio data to obtain a fourth result; and when the fourth result is no, determine whether the any to-be-processed data is video data to obtain a fifth result.

The compression coding unit is configured to: when the first result is yes, encode the to-be-processed data by using a text coding algorithm to obtain text coding data; when the second result is yes, encode the to-be-processed data by using a digital coding algorithm to obtain digital coding data; when the third result is yes, encode the to-be-processed data by using an image coding algorithm to obtain image coding data; when the fourth result is yes, encode the to-be-processed data by using an audio coding algorithm to obtain audio coding data; and when the fifth result is yes, encode the to-be-processed data by using a video coding algorithm to obtain video coding data.

Optionally, the concatenation reassembly unit is configured to: separately assign unique binary identifiers to the text coding data, the digital coding data, the image coding data, the audio coding data, and the video coding data; perform data concatenation on the text coding data, the digital coding data, the image coding data, the audio coding data, and the video coding data by using each binary identifier as a delimiter; and pack concatenated data to obtain the data packet of home detection of cardiovascular disease.

Optionally, the image coding algorithm is Huffman coding or run-length coding; the audio coding algorithm is AAC compression coding or Opus compression coding; and the video coding algorithm is H.265 compression coding or MPEG compression coding.

Optionally, the relay transmission module includes a communication unit; and the communication unit employs a data communication mode based on Wi-Fi, Bluetooth, or radio frequency sensing.

Optionally, the apparatus further includes a device binding module.

The device binding module is configured to implement end-to-end binding with the external device to obtain data obtaining permission of the external device.

The device binding module is connected to the data obtaining module and the data obtaining module is configured to obtain the patient's body indicator data, the patient's living environment data, and the patient's home treatment data from the external device according to the data obtaining permission.

According to specific embodiments provided in the present discourse, the present discourse discloses the following technical effects:

In the present disclosure, the data obtaining module obtains the patient's body indicator data, the patient's living environment data, and the patient's home treatment data, the data fusion module separately performs periodical update, integration classification, and data compression on the foregoing data and then performs concatenation reassembly to obtain the data packet of home detection of cardiovascular disease, and then the relay transmission module sends the data packet of home detection of cardiovascular disease to the remote terminal. In the present disclosure, fusion and concatenation of multi-type multimodal data are implemented through the cooperation of the data obtaining module, the data fusion module, and the relay transmission module, so that more comprehensive information is obtained.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the objectives, features, and advantages of the present disclosure more comprehensible, the following further describes in detail the present disclosure with reference to the accompanying drawings and specific implementations.

Figure 1:
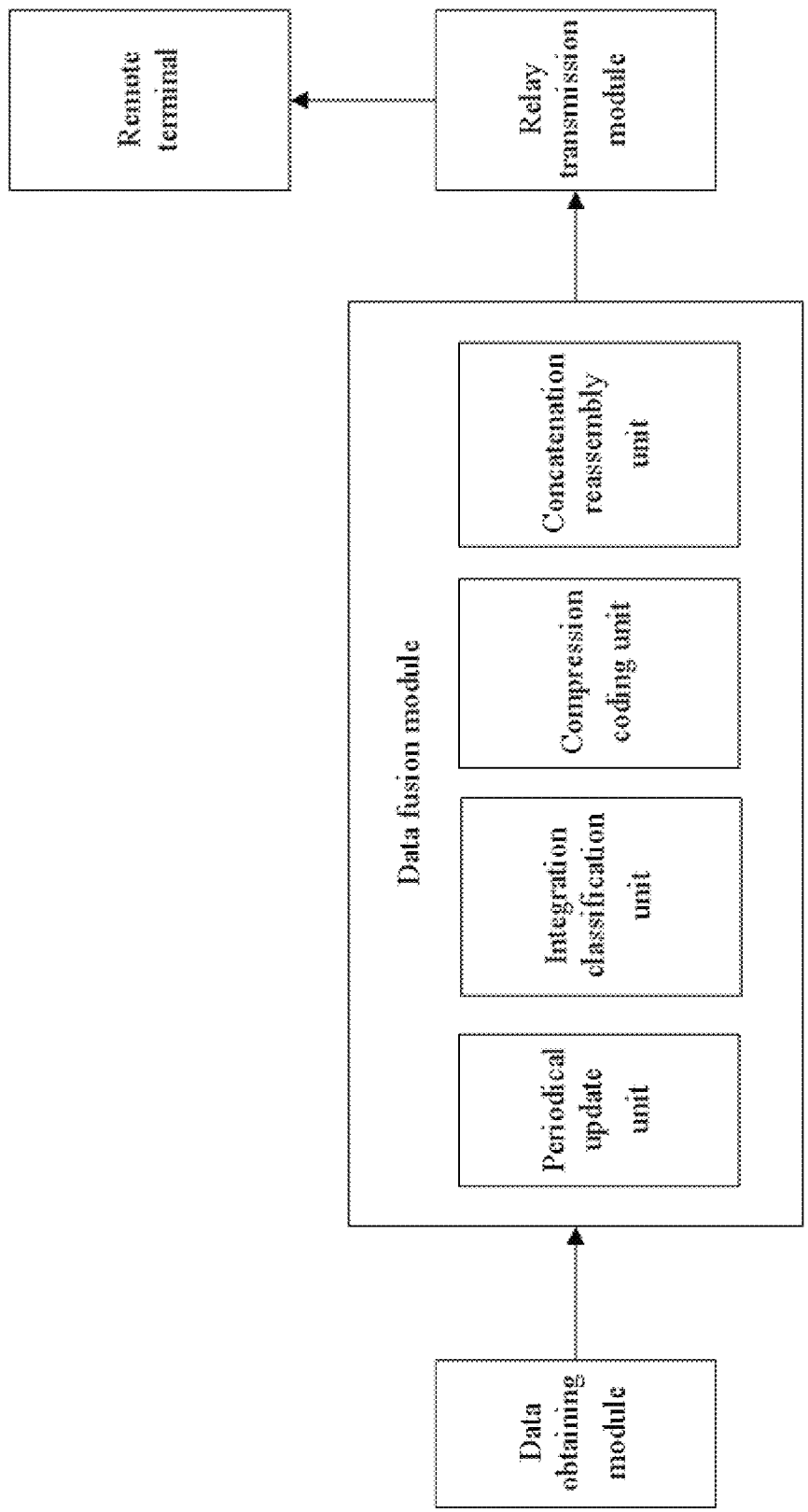
FIG. 1 is a schematic structural diagram of a multimodal heterogeneous data fusion relay apparatus for home detection of cardiovascular disease according to the present disclosure.

As shown in FIG. 1, the present disclosure provides a multimodal heterogeneous data fusion relay apparatus for home detection of cardiovascular disease, including a data obtaining module, a data fusion module, and a relay transmission module.

The data obtaining module is connected to an external device and the data obtaining module is configured to obtain patient's body indicator data, patient's living environment data, and patient's home treatment data.

The external device collects data of different modes, and data types of the patient's body indicator data, the patient's living environment data, and the patient's home treatment data include a text, a digit, an audio, an image, and a video.

The patient's body indicator data includes a heart rate, blood pressure, oxygen saturation, a body temperature, a urine volume, fluid intake, a body weight, and human trace elements.

(1) The heart rate includes a resting heart rate and an active heart rate, so as to monitor a cardiac activity and a dysrhythmia in a patient with a cardiovascular disease.

(2) The blood pressure includes systolic pressure and diastolic pressure, and is used to assess cardiac stress and vascular health in a patient with a cardiovascular disease.

(3) The oxygen saturation reflects a cardiopulmonary function and an oxygen carrying capacity of blood.

(4) For the body temperature, an abnormal body temperature can indirectly reflect a potential risk of a cardiovascular disease.

(6) The urine volume and the fluid intake are specifically a 24-hour urine volume and a 24-hour fluid intake in a patient with a cardiovascular disease, so as to assess a renal function and a body fluid balance of the patient.

(7) For the body weight, a body weight change also reflects health of a human body.

(8) The human trace elements are, for example, potassium, sodium and other detectable trace data.

The foregoing heart rate, blood pressure, oxygen saturation, and body temperature may be collected by using a sensor or a related detection device, and the foregoing body temperature, body weight, urine volume, fluid intake, and human trace elements may be collected by using a manual operation measurement tool.

The patient's living environment data includes a concentration of carbon dioxide, an ambient temperature, humidity, light intensity, and air quality data in the patient's environment. It should be learned that environmental factors such as air quality (PM2.5) and a noise level also directly affect cardiovascular health. The foregoing living environment data is mainly collected by a related sensor and a sensing device. In actual application, GPS positioning may also be performed on the patient's living environment as required.

The patient's home treatment data includes a physical activity level, medication data, rest data, diet data, maximum sitting duration, sleep quality data, and patient's self-perception information.

(1) The physical activity level is monitored by a device such as a pedometer or an accelerometer and is closely related to cardiovascular health.

(2) The medication data is a record of drug use. A patient with a cardiovascular disease needs to take drugs for a long time, and monitoring of types of drugs and drug use is very important for disease management.

(3) The rest data, the diet data, and the maximum sitting duration are the patient's living habit data, and smoking and alcohol consumption may also be included. These factors can affect cardiovascular health.

(4) The sleep quality data includes data such as sleep duration, depth of sleep, and respiratory interruptions.

(5) The patient's self-perception information includes a psychological status of a patient with a cardiovascular disease assessed by a psychological assessment scale, such as anxiety, depression, and stress, as well as the patient's self-report on physical conditions, including frequency, duration, and intensity of typical cardiovascular symptoms such as chest pain, difficulty breathing, palpitations, and fatigue.

Collection of the patient's home treatment data depends mainly on manual inputting, including but not limited to text inputting (such as rest data and medication frequency), photo uploading (such as a drug in a drug use record, a diet photo, and a patient's special behavior record), a video record (such as diet data and a patient's daily behavior record), and voice registration (such as patient self-perception information and patient's call rescue information, similar to Baidu's Duer).

In actual application, specific data included in the foregoing patient's body indicator data, the patient's living environment data, and the patient's home treatment data may be added or deleted as required. For example, collection of electrocardiogram data for a patient with a cardiovascular disease is added, where the electrocardiogram data includes a P wave, a QRS complex wave, a T wave, and the like, and is used to detect a cardiac disease such as an arrhythmia or a myocardial infarction. For another example, monitoring of inflammatory markers is added, where inflammation plays an important role in the development of the cardiovascular disease, and inflammation markers such as C-reactive protein (CRP) are monitored through simple blood tests, to provide information about a disease activity.

More specifically, to ensure security in a data transmission process, the apparatus further includes a device binding module, and the device binding module is connected to the data obtaining module. The device binding module is configured to implement end-to-end binding with the external device to obtain data obtaining permission of the external device. The data obtaining permission may be a unique device ID or preset public/private key data, and may be set according to an actual situation. The data obtaining module is configured to obtain the patient's body indicator data, the patient's living environment data, and the patient's home treatment data from the external device according to the data obtaining permission.

Through the cooperation of the device binding module, the external device, and the data obtaining module, after the apparatus starts to work, only patient's relevant data bound to the apparatus can be received, and body data of another irrelevant person is not received or collected. On the other hand, because the external device is bound to the device binding module, data leakage in data transmission due to an operation error or another reason can also be avoided.

The data fusion module is connected to the data obtaining module and the data fusion module is configured to: separately perform periodical update, integration classification, and data compression on the patient's body indicator data, the patient's living environment data, and the patient's home treatment data, and then perform concatenation reassembly to obtain a data packet of home detection of cardiovascular disease. Through the processing of the data fusion module, multimodal heterogeneous information or data in various structural, semi-structural, and non-structural forms is integrated and classified, and then concatenated and fused to obtain a final blood vessel disease home detection data packet that is applicable to transmission of a wireless relay apparatus.

Specifically, the data fusion module includes a periodical update unit, an integration classification unit, a compression coding unit, and a concatenation reassembly unit.

Figure 2:
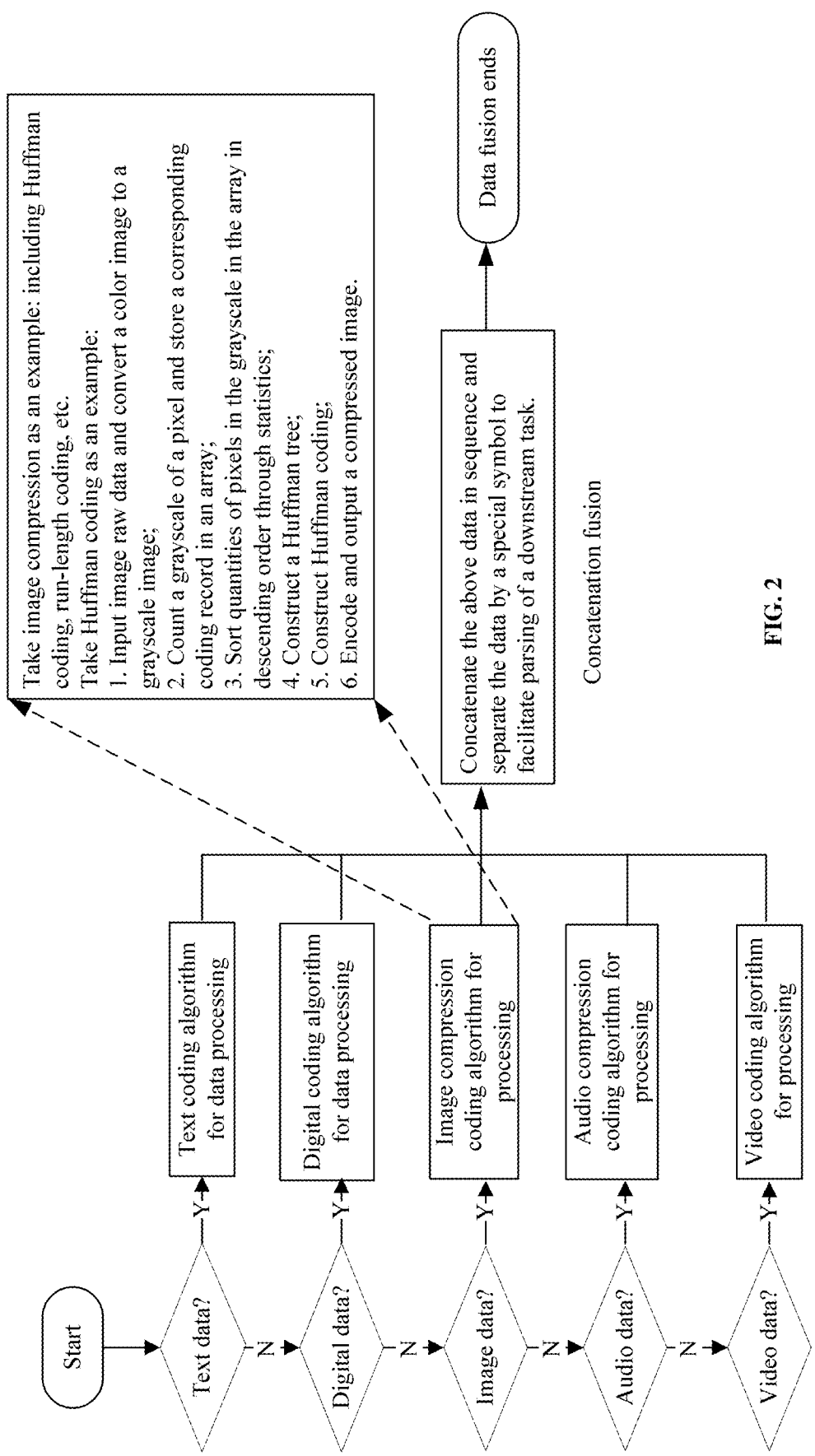
FIG. 2 is a schematic flowchart of implementation of a data fusion module according to the present disclosure.

As shown in FIG. 2, the periodical update unit is configured to performs the following operations: (1) A data set is periodically obtained from the data obtaining module, and a status value is assigned to any data in the data set. (2) When a status value of any data at a current moment is inconsistent with a status value at a previous data receiving moment, it indicates that data corresponding to the current moment changes, and a data set at the previous data receiving moment is updated according to data corresponding to the status value at the current moment; and then an updated data set at the previous data receiving moment is transmitted to the integration classification unit, so as to capture the changed data in time, and perform subsequent operations such as integration classification, compression coding, and concatenation reassembly on the updated data, where the data set includes the patient's body indicator data, the patient's living environment data, and the patient's home treatment data. (3) When a status value of any data at a current moment is consistent with a status value at a previous data receiving moment, it indicates that data corresponding to the current moment does not change, and to save computing resources, data uploading may not be performed, and subsequent operations such as integration classification, compression coding, and concatenation reassembly do not need to be performed.

The integration classification unit is configured to: determine whether any to-be-processed data in the data set transmitted by the periodical update unit is text data to obtain a first result; when the first result is no, determine whether the any to-be-processed data is digital data to obtain a second result; when the second result is no, determine whether the any to-be-processed data is image data to obtain a third result; when the third result is no, determine whether the any to-be-processed data is audio data to obtain a fourth result; and when the fourth result is no, determine whether the any to-be-processed data is video data to obtain a fifth result.

The compression coding unit is configured to: when the first result is yes, encode the to-be-processed data by using a text coding algorithm to obtain text coding data; when the second result is yes, encode the to-be-processed data by using a digital coding algorithm to obtain digital coding data; when the third result is yes, encode the to-be-processed data by using an image coding algorithm to obtain image coding data; when the fourth result is yes, encode the to-be-processed data by using an audio coding algorithm to obtain audio coding data; and when the fifth result is yes, encode the to-be-processed data by using a video coding algorithm to obtain video coding data. When the fifth result is no, a data error signal is directly output to remind a related worker.

Specifically, the image coding algorithm is Huffman coding or run-length coding; the audio coding algorithm is AAC compression coding or Opus compression coding; and the video coding algorithm is H.265 compression coding or MPEG compression coding. A specific process of Huffman coding includes: (1) converting raw data of an input color image into a grayscale image; (2) counting a grayscale of a pixel in the grayscale image, and storing a corresponding coding record in an array; (3) sorting quantities of pixels in the grayscale in the array in descending order through statistics; (4) constructing a Huffman tree; (5) constructing Huffman coding; and (6) encoding and outputting a compressed image.

The concatenation reassembly unit is configured to: separately assign unique binary identifiers to the text coding data, the digital coding data, the image coding data, the audio coding data, and the video coding data; perform data concatenation on the text coding data, the digital coding data, the image coding data, the audio coding data, and the video coding data by using each binary identifier as a delimiter; and pack concatenated data to obtain the data packet of home detection of cardiovascular disease.

A concatenation example is as follows: Unique binary identifiers 001, 010, 011, 100, and 101 are respectively assigned to the text coding data, the digital coding data, the image coding data, the audio coding data, and the video coding data, and then concatenation is performed in a form of "001 text coding data 010 digital coding data 011 image coding data 100 audio coding data 101 video coding data" to obtain the data packet of home detection of cardiovascular disease. By means of such concatenation, when the remote terminal receives the data packet for data parsing, a type of data (such as the text coding data) can be quickly parsed, thereby improving data processing efficiency.

The relay transmission module is connected to the data fusion module and the relay transmission module is configured to send the data packet of home detection of cardiovascular disease to a remote terminal. Specifically, the relay transmission module includes a communication unit; and the communication unit employs a data communication mode based on Wi-Fi, Bluetooth, or radio frequency sensing.

In actual application, the data obtaining module and the data fusion module in the multimodal heterogeneous data fusion relay apparatus for home detection of cardiovascular disease in the present disclosure are disposed in a central chip, and the central chip is connected to the external device (a hand band, a personal mobile phone, or the like) by using a USB interface or in another manner, to obtain required related data. The communication unit of the relay transmission module is disposed on a data sending component, and the data sending component, is a server end, and can send a data packet processed by the central chip to the remote terminal (a cloud or a back-end service). In addition, the apparatus further includes a power supply module, and the power supply module is configured to continuously supply power to the data sending component and the central chip.

The technical characteristics of the above embodiments can be combined arbitrarily. To provide concise description of these embodiments, all possible combinations of the technical characteristics of the above embodiments may not be described. However, these combinations of the technical characteristics should be construed as falling within the scope of the present specification as long as no contradiction occurs.

Specific examples are used in this specification to describe the principle and implementation manners of the present disclosure. The foregoing embodiments are merely intended to help understand the method and idea of the present disclosure. In addition, with respect to the implementation manners and the application scope, modifications may be made by a person of ordinary skill in the art according to the idea of the present disclosure. In conclusion, the disclosure of the specification shall not be understood as a limitation to the present disclosure.

What is claimed is:

1. A multimodal heterogeneous data fusion relay apparatus for home detection of cardiovascular disease, the apparatus comprising:
   a central computer chip comprising a data obtaining module and a data fusion module, and
   a relay transmission module disposed on a server end, wherein:
   the central computer chip is connected to both an external device and the server end;
   the data obtaining module is connected to the external device and the data obtaining module is configured to obtain patient's body indicator data, patient's living environment data, and patient's home treatment data;
   the data fusion module is connected to the data obtaining module and the data fusion module is configured to: separately perform periodical update, integration classification, and data compression on the patient's body indicator data, the patient's living environment data, and the patient's home treatment data, and then perform concatenation reassembly to obtain a data packet of home detection of cardiovascular disease;
   the relay transmission module is connected to the data fusion module and the relay transmission module is configured to send the data packet of home detection of cardiovascular disease to a remote terminal;
   the data fusion module comprises a concatenation reassembly unit; and
   the concatenation reassembly unit is configured to:
      assign unique binary identifiers 001, 010, 011, 100, and 101 to text coding data, digital coding data, image coding data, audio coding data, and video coding data, respectively,
      perform, by the assigned unique binary identifiers, concatenation in a form of "001 text coding data 010 digital coding data 011 image coding data 100 audio coding data 101 video coding data," to generate concatenated data; and
      pack the concatenated data to obtain the data packet of home detection of cardiovascular disease,
   wherein the patient's body indicator data comprises a heart rate, blood pressure, oxygen saturation, a body temperature, a urine volume, fluid intake, a body weight, and human trace elements,
   wherein the patient's living environment data comprises a concentration of carbon dioxide, an ambient temperature, humidity, light intensity, and air quality data,
   wherein the patient's home treatment data comprises a physical activity level, medication data, rest data, diet data, maximum sitting duration, sleep quality data, and the patient's self-perception information,
   wherein the patient's self-perception information comprises (i) a psychological status of a patient with cardiovascular disease assessed by a psychological assessment scale, and (ii) a patient's self-report on physical conditions, the physical conditions comprising frequency, duration, and intensity of typical cardiovascular symptoms;
   wherein the data fusion module comprises a periodical update unit, an integration classification unit, and a compression coding unit;
   wherein the integration classification unit is configured to:
      determine whether any to-be-processed data in the data set transmitted by the periodical update unit is text data to obtain a first result;
      when the first result is no, determine whether the any to-be-processed data is digital data to obtain a second result;

when the second result is no, determine whether the any to-be-processed data is image data to obtain a third result;

when the third result is no, determine whether the any to-be-processed data is audio data to obtain a fourth result; and when the fourth result is no, determine whether the any to-be-processed data is video data to obtain a fifth result; and wherein the compression coding unit is configured to:

when the first result is yes, encode the to-be-processed data by using a text coding algorithm to obtain the text coding data;

when the second result is yes, encode the to-be-processed data by using a digital coding algorithm to obtain the digital coding data;

when the third result is yes, encode the to-be-processed data by using an image coding algorithm to obtain the image coding data;

when the fourth result is yes, encode the to-be-processed data by using an audio coding algorithm to obtain the audio coding data; and when the fifth result is yes, encode the to-be-processed data by using a video coding algorithm to obtain the video coding data;

wherein the image coding algorithm is Huffman coding or run-length coding; the audio coding algorithm is AAC compression coding or Opus compression coding; and the video coding algorithm is H.265 compression coding or MPEG compression coding.

2. The multimodal heterogeneous data fusion relay apparatus for home detection of cardiovascular disease according to claim 1, wherein data types for each of the patient's body indicator data, the patient's living environment data, and the patient's home treatment data comprise a text, a digit, an audio, an image, and a video.

3. The multimodal heterogeneous data fusion relay apparatus for home detection of cardiovascular disease according to claim 1, wherein the periodical update unit is configured to:

periodically obtain a data set from the data obtaining module, and assign a status value to any data in the data set; and when a status value of any data at a current moment is inconsistent with a status value at a previous data receiving moment, update a data set at the previous data receiving moment according to data corresponding to the status value at the current moment, and transmit an updated data set at the previous data receiving moment to the integration classification unit, wherein the data set comprises the patient's body indicator data, the patient's living environment data, and the patient's home treatment data.

4. The multimodal heterogeneous data fusion relay apparatus for home detection of cardiovascular disease according to claim 1, wherein the relay transmission module comprises a communication unit; and the communication unit employs a data communication mode based on Wi-Fi, Bluetooth, or radio frequency sensing.

5. The multimodal heterogeneous data fusion relay apparatus for home detection of cardiovascular disease according to claim 1, wherein the apparatus further comprises a device binding module;

the device binding module is configured to implement end-to-end binding with the external device to obtain data obtaining permission of the external device; and the device binding module is connected to the data obtaining module and the data obtaining module is configured to obtain the patient's body indicator data, the patient's living environment data, and the patient's home treatment data from the external device according to the data obtaining permission.

\* \* \* \* \*